M. S. REILEY.
VALVE.
APPLICATION FILED OCT. 8, 1918.

1,322,201.

Patented Nov. 18, 1919.

Inventor
M. S. Reiley

By Lacey & Lacey Attorneys

UNITED STATES PATENT OFFICE.

MATTHEW S. REILEY, OF CALGARY, ALBERTA, CANADA.

VALVE.

1,322,201.  Specification of Letters Patent.  Patented Nov. 18, 1919.

Application filed October 8, 1918. Serial No. 257,377.

*To all whom it may concern:*

Be it known that I, MATTHEW S. REILEY, a citizen of the United States, residing at Calgary, in the Province of Alberta and Dominion of Canada, have invented certain new and useful Improvements in Valves, of which the following is a specification.

This invention seeks to provide a simple and inexpensive construction whereby the valve of an ordinary kitchen faucet may be firmly seated and held in closed position without excessive wear upon the seat-engaging member of the valve.

The invention is illustrated in the accompanying drawings, in which—

Figure 1:
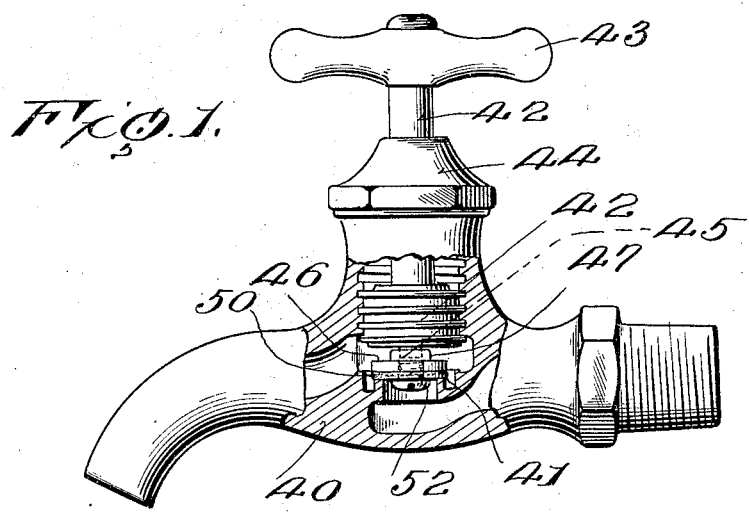
Figure 1 is a sectional elevation of a faucet having my improvements applied thereto the valve being seated and the stem just out of actual contact with the valve.

The faucet body 40 may be of the usual construction and is provided with an internal valve seat 41 while above the valve seat is mounted, in threaded engagement with the body, a valve stem 42 equipped with a handle 43 and normally retained within the body by a bonnet 44. Upon the lower end of the valve stem 42, I form a central cylindrical stud 45 and upon the upper side of the nut or base member 46 of the valve I form a central annular rim 47 having a smooth inner cylindrical wall and in axial alinement with a threaded bore 48 of the nut or base. In the outer portion of the nut I provide a recess 49, the function of which will be presently stated. The washer 50 of the valve may be of any elastic material and is provided with a central opening 51 through which the retaining screw 52 is inserted to engage the threaded bore 48 of the nut.

Figure 2:
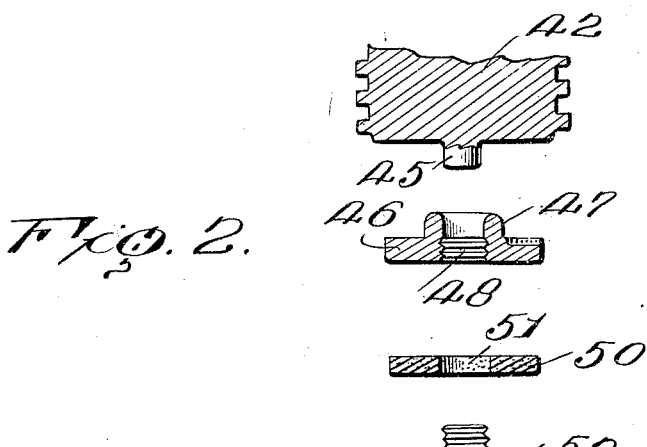
Fig. 2 is a view showing the parts of the valve on a larger scale in section and separated, but in their proper relative positions.
Figure 3:
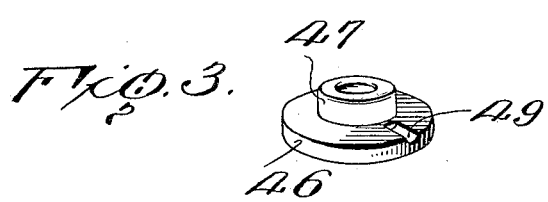
Fig. 3 is a detail perspective view of the nut or base member of the valve.

In operation, the stud 45 on the lower end of the valve stem will enter the bore or central opening of the rim 47 and will thereby serve to guide the valve and hold it alined centrally with the stem and with its seat and the upper surface of the rim is convex, as clearly shown in Fig. 2, so that the area of its contact with the lower end of the stem will be minimized and the wear upon the parts therefore reduced. It will also be readily noted that the rotary movement of the valve stem will not be transmitted to the valve but the stud 45 will rotate loosely in the bore of the rim 47 and, consequently, after the valve has been seated farther inward movement of the stem will merely compress the washer and will not cause the same to grind and wear upon the seat so that it will not be cut through and worn away as is the case in faucets now in general use. The stem and the stud are not attached to the rim or the valve. The only engagement between them is the very slight area of contact between the edge of the rim and the under surface of the end of the stem so that the stud and the rim serve to maintain the axial alinement of the stem and the valve while permitting free independent movement of the parts. The stem does not lift the valve in the opening movement and, if the pressure be cut off, the stem may be withdrawn from the valve body without withdrawing the valve from its seat so that the wear upon the parts is minimized. If the washer should happen to be very thin there may be contact between the end of the stud and the end of the screw but this accidental contact would not detract from or overcome the primary function of the stud which is to engage within the rim and effect centering of the valve relative to the stem. Primarily the seating pressure upon the valve is effected by the engagement of the lower end of the stem with the convex upper edge of the rim and the convexity of said edge minimizes the area of actual contact so that the frictional engagement between the two parts is practically negligible and rotation of the valve will not be caused by rotation of the stem but the longitudinal or axial movement of the stem due to its rotation within the body will compress the valve so as to effectually cut off the flow of water. Should the valve in its first engagement with the valve seat not sit plumb or flat the convex edge of the rim on the valve will permit the slight relative rocking movement of the valve which will follow its slightly imperfect seating without a cutting into and consequent wearing away of the lower end of the valve stem. The valve will be firmly seated and held to its seat with my construction just as in the constructions now most commonly used and, during the opening and closing movements of the valve, the pressure of the liquid within the faucet will hold the valve in proper relation to the valve stem. It sometimes becomes necessary to remove a washer and substitute a new one and as the valve in my device is small and has cylindrical surfaces only it cannot ordinarily be easily held against the turning action of a screw driver applied to the screw 52. To hold it against such turning, a pin or other convenient tool is engaged in the recess 49 and the nut or base member of the valve can then be easily held.

By the use of my construction the life of the washers will be prolonged and the cost of production of my valve will not be materially increased.

Having thus described my invention, what is claimed as new is:

In a faucet, the combination of a faucet body having a valve seat, a stem mounted in the body above the seat and provided on its lower end with a central depending cylindrical stud, all the surfaces of which are smooth, and a valve comprising a washer adapted to rest upon the valve seat, a nut against which the washer bears, means for securing the washer to the nut, and a rim upon the upper side of the nut having a smooth cylindrical bore to fit loosely over the stud on the valve stem and having its upper edge convex and adapted to bear against the lower end of the stem around the stud, the valve and the said rim being detached from the stud and the stem.

In testimony whereof I affix my signature.

MATTHEW S. REILEY. [L. S.]